(12) United States Patent
Wolff et al.

(10) Patent No.: US 8,657,300 B2
(45) Date of Patent: Feb. 25, 2014

(54) SEALING ELEMENT

(75) Inventors: Martin Wolff, Hattingen (DE); Birgit Budde, Remscheid (DE)

(73) Assignee: Johnson Controls GmbH, Burscheid (DE)

( * ) Notice: Subject to any disclaimer, the term of this patent is extended or adjusted under 35 U.S.C. 154(b) by 515 days.

(21) Appl. No.: 12/498,723

(22) Filed: Jul. 7, 2009

(65) Prior Publication Data

US 2009/0265998 A1 Oct. 29, 2009

Related U.S. Application Data

(63) Continuation of application No. 10/507,871, filed as application No. PCT/EP03/02693 on Mar. 14, 2003, now abandoned.

(30) Foreign Application Priority Data

Mar. 15, 2002 (DE) .................................. 102 11 684

(51) Int. Cl.
*F16J 3/00* (2006.01)

(52) U.S. Cl.
USPC .......................................... 277/634; 49/490.1

(58) Field of Classification Search
USPC ................. 277/569, 651, 634, 611, 638, 639; 49/490.1; 296/208, 193.06, 146.7, 296/146.9
See application file for complete search history.

(56) References Cited

U.S. PATENT DOCUMENTS

| | | | |
|---|---|---|---|
| 1,724,959 A * | 8/1929 | Page, Jr. et al. | 244/131 |
| 3,208,290 A * | 9/1965 | Mathues et al. | 403/38 |
| 3,215,442 A | 11/1965 | Papenguth | |
| 3,248,955 A * | 5/1966 | Templeton | 403/50 |
| 3,343,855 A | 9/1967 | Husen | |
| 3,343,857 A * | 9/1967 | Cislo | 403/132 |
| 3,441,298 A * | 4/1969 | Herbenar et al. | 403/134 |
| 3,451,700 A * | 6/1969 | Smith | 403/51 |
| 3,467,398 A | 9/1969 | Bernard | |
| 3,476,417 A * | 11/1969 | Born et al. | 403/134 |
| 3,531,133 A | 9/1970 | Gulick et al. | |
| 3,535,824 A | 10/1970 | Kessler | |
| 3,704,021 A | 11/1972 | Barbarin et al. | |
| 3,901,518 A * | 8/1975 | Uchida | 277/635 |
| 3,918,726 A | 11/1975 | Kramer | |
| 4,029,353 A * | 6/1977 | Barenyi et al. | 296/207 |
| 4,095,809 A | 6/1978 | Smith | |
| 4,253,675 A | 3/1981 | St. Laurent, Jr. | |
| 4,260,168 A | 4/1981 | Berg | |

(Continued)

FOREIGN PATENT DOCUMENTS

| | | |
|---|---|---|
| GB | 591901 | 9/1947 |
| JP | 03032952 A * | 2/1991 |
| WO | WO 95/09998 | 4/1995 |

*Primary Examiner* — Vishal Patel

(74) *Attorney, Agent, or Firm* — Foley & Lardner LLP

(57) ABSTRACT

The invention relates to a sealing element for sealing off component groups capable of being positioned in relation to one another, for use, in particular, in the vehicle and building technology sector, the sealing element has a first seal part 11 performing a sealing function and having a soft fraction and a second seal part 12 performing a reinforcing function and having a hard fraction. The sealing element is essentially an annular design and has an essentially accurately designed first seal part directed inward in the operating position, with a soft fraction, and an essentially frame-shaped second seal part arranged at the inwardly projecting end of the first seal part, with a hard fraction.

16 Claims, 1 Drawing Sheet

(56) References Cited

U.S. PATENT DOCUMENTS

| | | | |
|---|---|---|---|
| 4,441,723 A | 4/1984 | Greenwald | |
| 4,521,159 A * | 6/1985 | Pask | 416/174 |
| 4,530,506 A * | 7/1985 | Weiler et al. | 277/636 |
| 4,597,745 A * | 7/1986 | Orian | 464/173 |
| 4,667,968 A * | 5/1987 | Nash et al. | 277/568 |
| 4,783,115 A * | 11/1988 | Galubensky et al. | 296/208 |
| 5,005,317 A * | 4/1991 | Saint-Louis Augustin et al. | 49/495.1 |
| 5,251,917 A | 10/1993 | Chee et al. | |
| 5,380,114 A | 1/1995 | Urbach | |
| 5,568,930 A * | 10/1996 | Urbach | 277/635 |
| 5,927,891 A * | 7/1999 | Trumbower et al. | 403/114 |
| 6,296,296 B1 * | 10/2001 | Sekishiro et al. | 296/146.7 |
| 6,308,959 B1 * | 10/2001 | Sokolihs et al. | 277/394 |
| 6,319,113 B1 * | 11/2001 | Allershausen | 454/143 |
| 6,354,651 B1 * | 3/2002 | Mori | 296/146.1 |
| 6,438,048 B1 | 8/2002 | Kumar | |
| 6,554,555 B2 | 4/2003 | Imahigashi | |
| 6,572,317 B2 | 6/2003 | Okada et al. | |
| 6,585,201 B1 | 7/2003 | Reed | |
| 6,601,443 B1 | 8/2003 | Stumpe et al. | |
| 6,634,693 B2 | 10/2003 | Straesser, Jr. | |
| 6,685,195 B2 | 2/2004 | Uchida et al. | |
| 7,044,537 B2 * | 5/2006 | Schoemann et al. | 296/208 |
| 7,390,048 B2 * | 6/2008 | Yoshimura | 296/97.22 |
| 7,641,271 B1 * | 1/2010 | Haydin et al. | 296/208 |
| 8,025,559 B2 * | 9/2011 | Schweitzer | 454/69 |
| 2006/0079167 A1 * | 4/2006 | Krause et al. | 454/121 |
| 2008/0217963 A1 * | 9/2008 | Brunard | 296/208 |

* cited by examiner

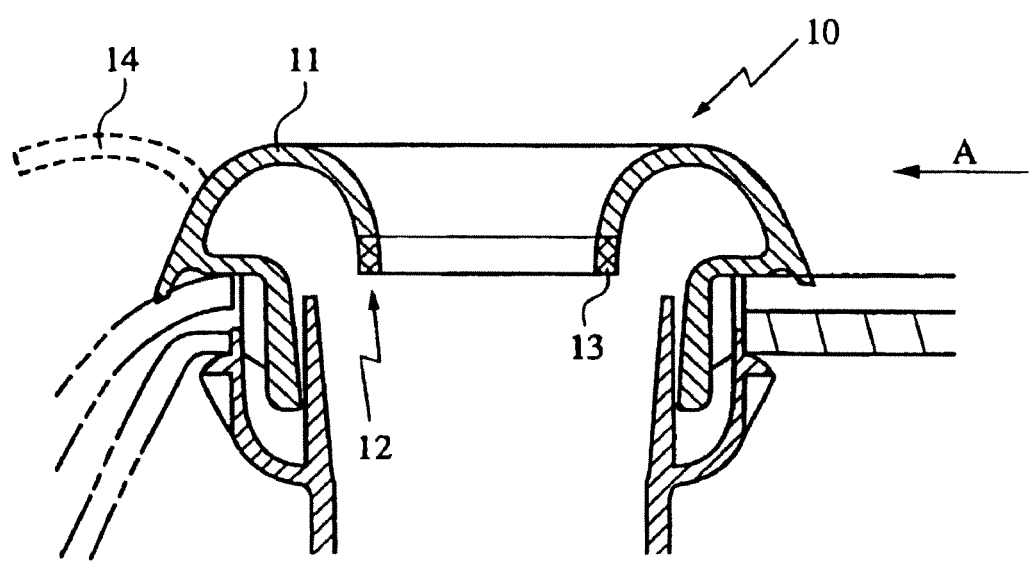

SEALING ELEMENT

CROSS REFERENCE TO RELATED APPLICATIONS

The present application is a continuation of U.S. application Ser. No. 10/507,871, filed Aug. 11, 2005, which is a National Stage of International Patent Application Ser. No. PCT/EP2003/002693, filed Mar. 14, 2003, which claims the benefit and priority of German Patent Application Ser. No. 10211684.9, filed Mar. 15, 2002. The foregoing applications are incorporated by reference herein in their entirety.

BACKGROUND OF THE INVENTION

The invention relates to a sealing element for sealing off component groups capable of being positioned in relation to one another, in particular for use in the vehicle and building technology sector, the sealing element including a first seal part performing a sealing function and a second seal part.

Various sealing elements are known from the prior art. In this context, on the one hand, sealing elements are known which consist only of a soft material, and in the case of an open profile configuration which can be produced without further additional measures, tend under loads, especially transverse to the seal position, to experience distortions of the profile of the sealing element, thus leading to a leak and possibly to operational failure. Furthermore, sealing elements having a compound construction are also known from the prior art. Thus, for example, DE 696 04 094 T2 discloses a sealing profile and a method for producing it, said sealing profile being produced by means of extrusion and having a reinforcement composed of thermoplastic and also a coating composed of elastomer, the reinforcement consisting of fiber-filled thermoplastic and being completely covered by at least one film or thin layer of non-fiber-filled thermoplastic to which the coating composed of elastomer adheres. Although an arrangement of this type satisfies demands as regards the requirements relating to the operational properties, the construction is nevertheless highly complicated here, and production is therefore likewise complicated and cost-intensive.

Proceeding from the known embodiments of sealing elements, the object on which the invention is based is, while preserving the advantages existing hitherto, to improve or develop further the known sealing elements to the effect that a sealing-off construction is made available, in which the sealing function is afforded in full and in which there is stabilization against deformation loads which may lead to functional restrictions or to operational failure. A cost-effective and visually pleasing design capable of being produced simply in a reproducible quality is at the same time to be implemented.

SUMMARY OF INVENTION

According to one embodiment of the invention, a sealing element is of an essentially annular design and has an essentially accurately designed first seal part directed inward in the operating position, with a soft fraction, and an essentially frame-shaped second seal part arranged at the inwardly projecting end of the first seal part, with a hard fraction. This affords the possibility, by simple means, of using a sealing element of simple construction between two component groups, and in this case, during the assembly of the component groups, even a load acting transversely to the seal position can be compensated; in the sealing element according to the invention, this takes place in that the hard fraction of the second seal part stabilizes the geometry of the soft fraction of the first seal part and acting transverse forces can be absorbed, with the result that a possible profile distortion is prevented. The sealing function itself in this case continues to be carried out by sealing bearing contact via the soft fraction.

In the sealing element according to the invention, the load acting transversely to the sealing direction is in this case absorbed by the essentially frame-shaped second seal part with a hard fraction, in such a way that a regional distortion of the sealing element can no longer take place, a sealing deformation of the soft fraction in the sealing direction continuing to be present in a functionally appropriate way, and, moreover, a uniform sealing bearing contact being assisted by this construction, since a regional profile collapse is prevented by the supporting action of the frame-shaped seal part with a hard fraction. This results, overall, in a sealing element which no longer permits any profile distortion and thereby increases operating reliability, which gives rise to an action supporting the entire soft profile in the sealing direction and thereby contributes to quality optimization, and which can be produced cost-effectively in a process sequence. Moreover, the sealing element according to the invention can have a visually pleasing design and affords increased freedom of configuration.

In the preferred embodiment of the sealing element according to the invention, the second seal part with a hard fraction is designed as a peripheral reinforcement. This design is especially advantageous in structural terms.

According to a further feature of the present invention, the second seal part with a hard fraction is designed as a part element integrally formed by injection molding. This design is advantageous in manufacturing terms.

It is recommended, according to a further feature of the present invention, that the essentially annularly designed sealing element be designed as a closed ring. This is an embodiment which is advantageous for achieving good sealing off.

It is expedient, according to a further feature, that the essentially frame-shaped second seal part of the sealing element is not arranged in direct range of vision. In this case, there is no need for the provision of additional visually effective means for improving the external appearance.

In an alternative embodiment, the essentially frame-shaped second seal part of the sealing element is arranged in direct range of vision.

It is recommended, furthermore, that the essentially frame-shaped second seal part of the sealing element be designed with the same color as the first seal part.

According to a final feature of the present invention, should the essentially frame-shaped second seal part of the sealing element be arranged in direct range of vision, this essentially frame-shaped second seal part, in particular together with the first seal part, has an injection overmolding.

BRIEF DESCRIPTION OF THE FIGURE

FIG. 1 shows a vertical section through the sealing element according to the invention for an air outlet seal of a door trim on the B-column of a vehicle.

DESCRIPTION

A sealing element 10 serves for sealing off component groups capable of being positioned in relation to one another, in particular for use in the vehicle and building technology sector. The sealing element 10 comprises a first seal part, designated by 11, performing a sealing function and having a soft fraction and a second seal part, designated by 12, performing a reinforcing function and having a hard fraction. In this respect, FIG. 1 of the drawing illustrates the sealing element 10 according to the invention with the first seal part 11 and with the second seal part 12, the sealing element 10 being used here between two component groups merely indicated and not designated. In this case, broken lines illustrate a profile distortion, designated by 14, of the first seal part 11, with a soft fraction, of a sealing element 10, as is known from the prior art.

The sealing element 10 is of essentially annular design, and it has an essentially accurately designed first seal part 11 directed inward in the operating position, with a soft fraction, and an essentially frame-shaped second seal part 12 arranged at the inwardly projecting end of the first seal part 11, with a hard fraction. In this case, the second seal part 12 with a hard fraction is designed as a peripheral reinforcement 13. This second seal part 12 with a hard fraction may in this case preferably be designed as a part element integrally formed by injection molding.

In the exemplary embodiment illustrated, the essentially annularly designed sealing element 10 is designed as a closed ring. In this version, this closed ring is provided, for example, for use on an air outlet seal of a door trim on the B-column of a vehicle. In this case, with a separate ventilation of the back region of a vehicle, the air from the instrument panel region can be conducted into the door and, via an air duct, into the B-column and from there into the back space. In this case, the transitions of the components are to be sealed off against the outlet of air, and roses with seals can be used in the door trim. Particularly in the rear door region, it may be possible, owing to the vehicle structure, that the closing direction of the doors is transverse to the seal routing. Thus, at the soft seal, transverse forces arise which may lead to profile-distorting loads. The solution possibility illustrated is a seal which is produced in one part in a process sequence as a 2-component injection molding with a soft fraction for the seal itself and with a peripheral frame-shaped hard fraction which is firmly tied to the open geometrical end of the soft fraction.

The sealing element 10 according to the invention can be used between two component groups, and, during the assembly of the component groups, even a load acting transversely to the seal position, see the arrow A in FIG. 1, can be compensated; in the sealing element 10 according to the invention, this takes place in that the hard fraction of the second seal part 12 stabilizes the geometry of the soft fraction of the first seal part 11 and acting transverse forces can be absorbed, with the result that possible profile distortion is prevented. The sealing function itself in this case continues to take place by means of sealing bearing contact via the soft fraction.

Thus, in the sealing element 10 according to the invention, by means of the essentially frame-shaped second seal part 12 with a hard fraction, the load according to the arrow A which acts transversely to the sealing direction is absorbed in such a way that a regional distortion of the sealing element 10 can no longer take place, a sealing deformation of the soft fraction in the sealing direction continuing to be present in a functionally appropriate way, and, moreover, uniform sealing bearing contact being assisted by this construction, since a regional profile collapse is prevented by the supporting action of the frame-shaped seal part 12 with a hard fraction. This results, overall, in a sealing element 10 which no longer permits any profile distortion and thereby increases operating reliability, which gives rise to the action of supporting the entire soft profile in the sealing direction and thereby contributes to quality optimization, and which can be produced cost-effectively in a process sequence.

Moreover, the sealing element 10 according to the invention can have visually pleasing design and affords increased freedom of configuration. Thus, in a preferred embodiment, the essentially frame-shaped second seal part 12 of the sealing element 10 cannot be arranged in direct range of vision. In another embodiment, the essentially frame-shaped second seal part 12 of the sealing element 10 may be arranged in direct range of vision. In this case, the essentially frame-shaped second seal part 12, in particular together with the first seal part 11, may have an injection overmolding, not designated in any more detail here. In this case, however, a somewhat increased outlay in die terms is required during manufacture. Moreover, it is also possible that the essentially frame-shaped second seal part 12 of the sealing element 10 is designed with the same color as the first seal part 11.

Different possibilities of use, particularly in the vehicle and building technology sector, arise for the sealing element 10 according to the invention. Thus, for example, the sealing element 10 according to the invention can be used for all seals, such as, for example, air routing seals with a support requirement, for example on vehicle parts. There is provision, furthermore, for use also for bearing edge optimization from a soft component to a reception component.

As already mentioned, the embodiments illustrated are merely exemplary implementations of the invention which is not restricted to these, but, on the contrary, many different changes and designs are also possible. Thus, in particular, modifications with regard to the structural configuration of the sealing element 10 or of its first seal part 11 with a soft fraction and/or of its second seal part 12 with a hard fraction may be envisaged. Furthermore, of course, uses in component groups other than those illustrated in the FIGURE of the drawing are provided.

What is claimed is:

1. A sealing element for sealing off an air outlet of a vehicle door, the sealing element comprising:
    a first seal part performing a sealing function and having a soft fraction; and
    a second seal part performing a reinforcing function and having a hard fraction, the second seal part cooperating with the first seal part to provide the air outlet,
    wherein the sealing element has a closed ring design,
    wherein the first seal part has an arcuately-shaped cross sectional profile extending between a first distal end that includes a sealing surface and an opposite second distal end that is directed inward in the operating position, the second distal end having a thickness in a radial direction,
    wherein the second seal part extends from the second distal end of the first seal part in a direction away from the first seal part, the second seal part permits distortion of the sealing element at the sealing surface to create a seal and reduces deformation of the profile of the first seal part,
    wherein the arcuately-shaped cross sectional profile of the first seal part extends continuously through to the second distal end and the second seal part extends from the second distal end as a continuation of the arcuately-shaped cross sectional profile,
    wherein the second seal part is integrally formed with the first seal part, such that the second seal part extends with a continuous thickness along the arcuately-shaped cross sectional profile, and
    wherein the continuous thickness of the second seal part is substantially the same as the thickness of the second distal end.

2. The sealing element as claimed in claim 1, wherein the second seal part is positioned as a peripheral reinforcement.

3. The sealing element as claimed in claim 1, wherein the second seal part is integrally formed by injection molding.

4. The sealing element as claimed in claim 1, wherein the closed ring design has an open geometry at the second distal end of the first seal part and the second seal part.

5. The sealing element as claimed in claim 1, wherein the second seal part of the sealing element is not visible.

6. The sealing element as claimed in claim 1, wherein the second seal part of the sealing element is visible.

7. The sealing element as claimed in claim 1, wherein the second seal part of the sealing element is the same color as the first seal part.

8. The sealing element as claimed in claim 6, wherein the second seal part of the sealing element further comprises an injection overmolding.

9. A sealing element for sealing off an air outlet of a vehicle door, the sealing element comprising:
  a first seal part performing a sealing function and having a soft fraction; and
  a second seal part performing a reinforcing function and having a hard fraction, the second seal part cooperating with the first seal part to provide the air outlet,
  wherein the sealing element has a closed ring design,
  wherein the first seal part has an arcuately-shaped cross sectional profile extending between a first distal end having a sealing surface and an opposite second distal end that is directed inward in the operating position, the sealing surface of the seal part distorts under a load acting transversely to a sealing direction of the sealing surface, the opposite distal end having a thickness in a radial direction,
  wherein the second seal part extends from the second distal end of the first seal part in a direction away from the first seal part, remote from the deformable sealing surface of the first seal part, and reduces deformation of the profile of the first seal part when under the load,
  wherein the arcuately-shaped cross sectional profile of the first seal part extends continuously through to the second distal end and the second seal part extends from the second distal end as a continuation of the arcuately-shaped cross sectional profile, the arcuately-shape cross sectional profile of the second seal part having a radial thickness,
  wherein the second seal part is integrally formed with the first seal part, such that the second seal part extends with a continuous thickness along the arcuately-shaped cross sectional profile, and
  wherein the radial thickness of the arcuately-shape cross sectional profile is substantially the same as the thickness of the opposite distal end.

10. A sealing element for sealing off an air outlet of a vehicle door, the sealing element comprising:
  a first seal part performing a sealing function and having a soft fraction; and
  a second seal part performing a reinforcing function and having a hard fraction, the second seal part cooperating with the first seal part to provide the air outlet,
  wherein the sealing element has a closed ring design,
  wherein the first seal part has an arcuately-shaped cross sectional profile extending between a first distal end having a sealing surface and an opposite second distal end that is directed inward in the operating position, the opposite distal end having a thickness in a radial direction,
  wherein the second seal part extends from the second distal end of the first seal part in a direction away from the first seal part to reduce deformation of the profile of the first seal part when under a load acting transversely to a sealing direction of the sealing surface,
  wherein the arcuately-shaped cross sectional profile of the first seal part extends continuously through to the second distal end and the second seal part extends from the second distal end as a continuation of the arcuately-shaped cross sectional profile, the arcuately-shape cross sectional profile of the second seal part having a radial thickness,
  wherein the second seal part is integrally formed with the first seal part, such that the second seal part extends with a continuous thickness along the arcuately-shaped cross sectional profile, and
  wherein the radial thickness of the arcuately-shaped cross sectional profile is substantially the same as the thickness of the second distal end.

11. An annular sealing element for sealing off an air outlet of a vehicle door, the sealing element comprising:
  a first part including a soft fraction having a closed ring design and an arcuate cross section extending between a first distal end and an opposite second distal end that is directed inward, the first distal end defining a sealing surface configured to be maintained in a sealing position; the opposite distal end having a thickness in a radial direction, and
  a second part including a hard fraction having a closed ring design and extending away from the second distal end of the soft fraction, the hard fraction stabilizing the soft fraction to maintain the sealing position when the soft fraction is exposed to a force acting transverse to the sealing position, the second part cooperating with the first part to provide the air outlet,
  wherein the arcuate cross section of the first part extends continuously through to the second distal end and the second part extends from the second distal end as a continuation of the arcuate cross section, the arcuately-shape cross sectional profile of the second part having a radial thickness,
  wherein the second part is integrally formed with the first part, such that the second part extends with a continuous thickness along the arcuate cross section, and
  wherein the radial thickness of the arcuately-shape cross sectional profile is substantially the same as the thickness of the opposite distal end.

12. The sealing element of claim 11, wherein the second part is positioned as a peripheral reinforcement.

13. The sealing element of claim 11, wherein the second part is integrally formed with the first part by injection molding.

14. The sealing element of claim 11, wherein the closed ring design has an open geometry at the second distal end of the first part and the second part.

15. The sealing element of claim 11, wherein the second part of the sealing element is not visible.

16. The sealing element of claim 11, wherein the second part of the sealing element is visible.

* * * * *